(12) United States Patent
Liu et al.

(10) Patent No.: US 11,741,593 B2
(45) Date of Patent: Aug. 29, 2023

(54) PRODUCT DEFECT DETECTION METHOD, DEVICE AND SYSTEM

(71) Applicant: GOERTEK INC., Shandong (CN)

(72) Inventors: Jie Liu, Shandong (CN); Jifeng Tian, Shandong (CN); Fuli Xie, Shandong (CN); Shunran Di, Shandong (CN); Yifan Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 267 days.

(21) Appl. No.: 17/309,407

(22) PCT Filed: Aug. 26, 2020

(86) PCT No.: PCT/CN2020/111313
§ 371 (c)(1),
(2) Date: May 25, 2021

(87) PCT Pub. No.: WO2021/135300
PCT Pub. Date: Jul. 8, 2021

(65) Prior Publication Data
US 2022/0309640 A1    Sep. 29, 2022

(30) Foreign Application Priority Data

Dec. 30, 2019  (CN) .......................... 201911397516.3

(51) Int. Cl.
  *G06V 10/70* (2022.01)
  *G06T 7/00* (2017.01)
  *G01N 21/88* (2006.01)

(52) U.S. Cl.
  CPC ....... *G06T 7/0004* (2013.01); *G01N 21/8851* (2013.01); *G06V 10/70* (2022.01);
  (Continued)

(58) Field of Classification Search
  CPC ......... G06T 7/0004; G06T 2207/10004; G06T 2207/20081; G06T 2207/30108;
  (Continued)

(56) References Cited

U.S. PATENT DOCUMENTS

| 8,457,414 B2 * | 6/2013 | Jahanbin | ................ G06V 10/42 |
|---|---|---|---|
| | | | 382/224 |
| 2004/0032979 A1 * | 2/2004 | Honda | .................. G06T 7/0004 |
| | | | 382/209 |

(Continued)

FOREIGN PATENT DOCUMENTS

| CN | 105930815 A | 9/2016 |
|---|---|---|
| CN | 106340016 A | 1/2017 |

(Continued)

*Primary Examiner* — Sheela C Chawan
(74) *Attorney, Agent, or Firm* — LKGlobal | Lorenz & Kopf, LLP

(57) ABSTRACT

A product defect detection method, device and system are disclosed. The method comprises: acquiring a sample image of a product, extracting candidate image blocks probably including a product defect from the sample image, and extracting preset shape features corresponding to the candidate image blocks and texture features corresponding to the candidate image blocks; training a first-level classifier using the preset shape features to obtain a first-level classifier that can further screen out target image blocks probably including a product defect from the candidate image blocks; training a second-level classifier using the texture features to obtain a second-level classifier that can correctly identify a product defect; and when performing product defect detection, inputting preset shape features of candidate image blocks extracted from a product image into the first-level classifier, and then inputting texture features of obtained target image blocks into the second-level classifier to detect a defect in the product.

20 Claims, 3 Drawing Sheets

(52) U.S. Cl.
CPC .............. *G06T 2207/10004* (2013.01); *G06T 2207/20081* (2013.01); *G06T 2207/30108* (2013.01)

(58) Field of Classification Search
CPC ...... G06T 2207/30164; G01N 21/8851; G01N 2021/8854; G01N 2021/8883; G01N 2021/8887; G06V 10/70; G06F 18/214; G06F 18/2411
USPC .................................................. 382/100, 141
See application file for complete search history.

(56) References Cited

U.S. PATENT DOCUMENTS

| | | | |
|---|---|---|---|
| 2017/0069075 A1* | 3/2017 | Okuda | G06V 10/764 |
| 2018/0253836 A1 | 9/2018 | Huang et al. | |
| 2018/0301071 A1 | 10/2018 | Zhang et al. | |

FOREIGN PATENT DOCUMENTS

| | | | |
|---|---|---|---|
| CN | 107341499 A | 11/2017 | |
| CN | 108564124 A | 9/2018 | |
| CN | 109711345 A | 5/2019 | |
| CN | 109712135 A | 5/2019 | |
| CN | 109859181 A | 6/2019 | |
| CN | 109949305 A | 6/2019 | |
| CN | 110060237 A | 7/2019 | |
| CN | 110458791 A | 11/2019 | |
| CN | 110533023 A | 12/2019 | |
| CN | 110570396 A | 12/2019 | |
| CN | 111161246 A | 5/2020 | |

* cited by examiner

PRODUCT DEFECT DETECTION METHOD, DEVICE AND SYSTEM

CROSS-REFERENCE TO RELATED APPLICATION

This application is a U.S. National-Stage entry under 35 U.S.C. § 371 based on International Application No. PCT/CN2020/111313, filed Aug. 26, 2020 which was published under PCT Article 21(2) and which claims priority to Chinese Application No. 201911397516.3, filed Dec. 30, 2019, which are all hereby incorporated herein in their entirety by reference.

TECHNICAL FIELD

This Application pertains to a product defect detection method, device and system.

BACKGROUND

In the traditional precision manufacturing industry, product defect detection is generally completed by manual inspection. In a typical manufacturing plant, nearly 30% of the employees are inspection personnel. Due to the large labor demand, recruitment is difficult; moreover, the work intensity of inspection is high, and the inspection quality is easy to fluctuate due to fatigue. Therefore, automated inspection solutions of machines that have stable inspection quality, consistent results, and are not affected by human factors will surely be welcomed by the traditional precision manufacturing industry. In addition, other objects, desirable features and characteristics will become apparent from the subsequent summary and detailed description, and the appended claims, taken in conjunction with the accompanying drawings and this background.

SUMMARY

The objective of the embodiments of the present disclosure is to provide a product defect detection method, device and system.

According to an aspect of the present disclosure, a product defect detection method is provided. The method comprises:

acquiring a sample image of a product, extracting candidate image blocks probably including a product defect from the sample image, and extracting preset shape features corresponding to the candidate image blocks and texture features corresponding to the candidate image blocks;

training a first-level classifier using the preset shape features to obtain a first-level classifier that can further screen out target image blocks probably including a product defect from the candidate image blocks;

training a second-level classifier using the texture features to obtain a second-level classifier that can correctly identify a product defect; and when performing product defect detection, inputting preset shape features of candidate image blocks extracted from a product image into the first-level classifier, and then inputting texture features of obtained target image blocks into the second-level classifier to detect a defect in the product.

According to another aspect of the present disclosure, a product defect detection device is provided. The device comprises:

a preprocessing unit configured to acquire a sample image of a product, extract candidate image blocks probably including a product defect from the sample image, and extract preset shape features corresponding to the candidate image blocks and texture features corresponding to the candidate image blocks; train a first-level classifier using the preset shape features to obtain a first-level classifier that can further screen out target image blocks probably including a product defect from the candidate image blocks; train a second-level classifier using the texture features to obtain a second-level classifier that can correctly identify a product defect; and a defect detection unit configured to, when performing product defect detection, input preset shape features of candidate image blocks extracted from a product image into the first-level classifier, and then input texture features of obtained target image blocks into the second-level classifier to detect a defect in the product.

According to still another aspect of the present disclosure, a product defect detection system is provided. The system comprises: a memory and a processor;

the memory stores computer executable instructions;

when the computer-executable instructions are executed, the processor executes the product defect detection method.

According to yet still another aspect of the present disclosure, a computer-readable storage medium is provided. One or more computer programs are stored on the computer-readable storage medium, and the product defect detection method is implemented when the one or more computer programs are executed.

The present disclosure can achieve at least the following technical effects. The present disclosure trains a first-level classifier and a second-level classifier using sample images in advance, and when detecting product defects, performs the first screening of candidate image blocks by extracting candidate image blocks probably including a product defect from the product image, and performs the second screening of candidate image blocks of the product image using the first-level classifier. The rough classification operation of the image blocks is completed by the first screening and the second screening. Then the third screening is performed by screening the target image blocks using the second-level classifier. The fine classification operation of the image blocks is completed by the third screening. Through the combination of the rough classification operation and the fine classification operation, the target image blocks including a product defect can be screened out, namely, the defects in the product can be quickly and accurately detect based on the target image blocks including a product defect.

BRIEF DESCRIPTION OF DRAWINGS

The present invention will hereinafter be described in conjunction with the following drawing figures, wherein like numerals denote like elements, and.

DETAILED DESCRIPTION

Figure 1:
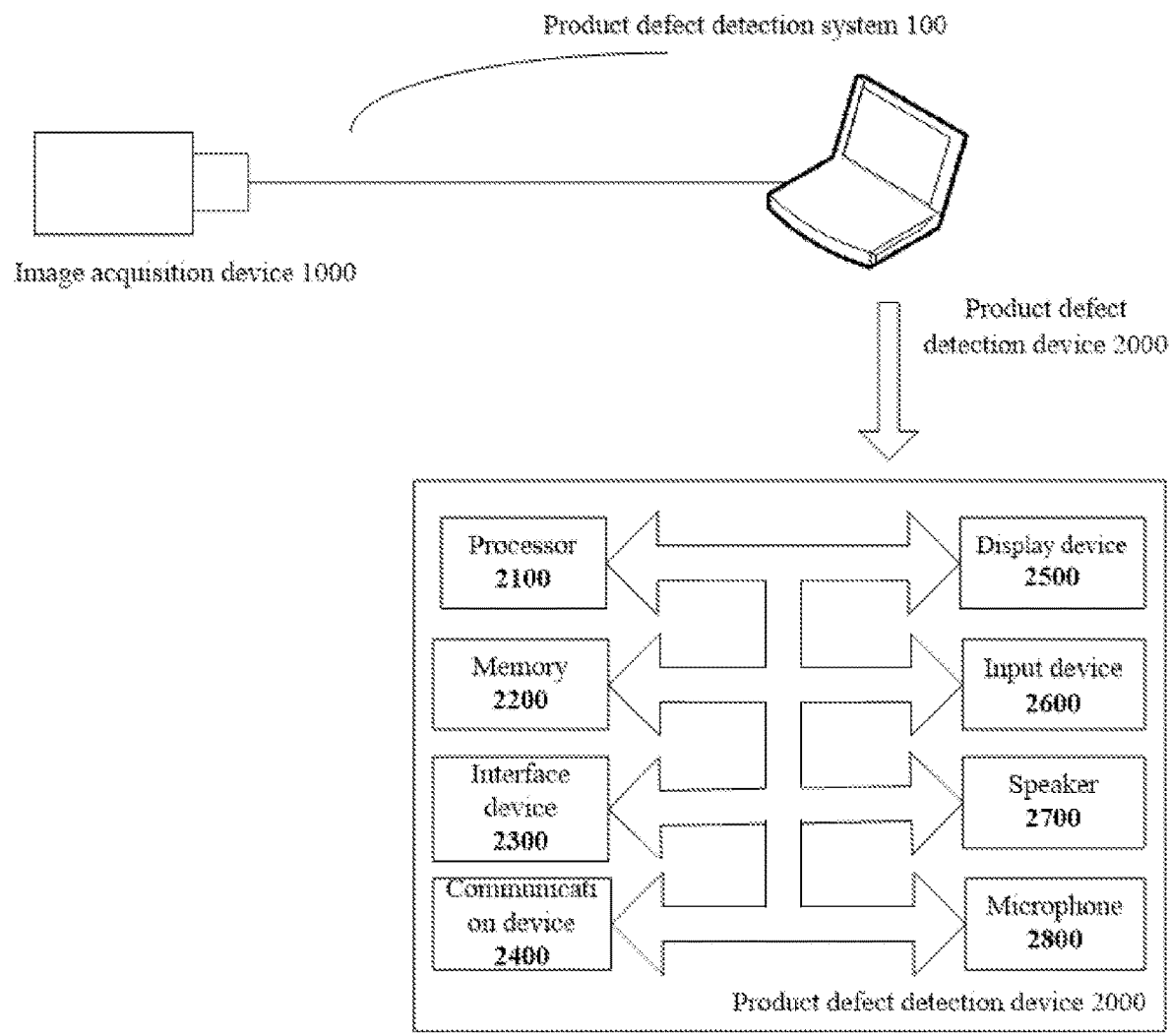
FIG. 1 is a block diagram of the hardware configuration of a product defect detection system according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless specified otherwise, the arrangements of the members and steps, mathematical formulas and numerical values described in these embodiments do not limit the scope of the present disclosure.

The following description of at least one embodiment is actually for illustrative purposes only, and is not intended to limit the present disclosure and application or use thereof in any way.

The techniques, methods and devices well known to a person skilled in the related arts may not be discussed in detail. However, when applicable, such techniques, methods and devices should be deemed as a part of the description.

In all the examples shown and discussed herein, any specific value should be interpreted as illustrative only rather than restrictive. Therefore, other examples in the embodiments may have different values.

It should be noted that similar reference numerals and letters in the following drawings represent similar items. Therefore, once an item is defined in a drawing, it may not be further discussed in the subsequent drawings.

First Embodiment

FIG. 1 is a block diagram of the hardware configuration of a product defect detection system 100 according to an embodiment of the present disclosure.

As shown in FIG. 1, the product defect detection system 100 comprises an image acquisition device 1000 and a product defect detection device 2000.

The image acquisition device 1000 is configured to acquire a product image and provide the acquired product image to the product defect detection device 2000.

The image acquisition device 1000 may be any imaging device capable of taking pictures, such as a camera, etc.

The product defect detection device 2000 may be any electronic device, such as a PC, a notebook computer, a server, etc.

In the present embodiment, referring to FIG. 1, the product defect detection device 2000 may comprise a processor 2100, a memory 2200, an interface device 2300, a communication device 2400, a display device 2500, an input device 2600, a speaker 2700, a microphone 2800, etc.

The processor 2100 may be a mobile version processor. The memory 2200 includes, for example, ROM (Read Only Memory), RAM (Random Access Memory), nonvolatile memory such as a hard disk, etc. The interface device 2300 includes, for example, a USB interface, a headphone interface, etc. The communication device 2400 can, for example, perform wired or wireless communication. The communication device 2400 may include short-range communication devices, for example, any device that performs short-range wireless communication based on a short-range wireless communication protocol such as Hilink protocol, WiFi (IEEE 802.11 protocol), Mesh, Bluetooth, ZigBee, Thread, Z-Wave, NFC, UWB, LiFi, etc. The communication device 2400 may also include a remote communication device, for example, any device that performs WLAN, GPRS, 2G/3G/4G/5G remote communication. The display device 2500 is, for example, a liquid crystal display screen, a touch screen, etc. The display device 2500 is configured to display the product image acquired by the image acquisition device 1000. The input device 2600 may include, for example, a touch screen, a keyboard, etc. The user can input/output voice information through the speaker 2700 and the microphone 2800.

In the present embodiment, the memory 2200 of the product defect detection device 2000 is configured to store instructions for controlling the processor 2100 to operate to at least execute the product defect detection method according to any embodiment of the present disclosure. A person skilled in the art can design instructions according to the solutions disclosed in the present disclosure. It is well known in the art how the instructions control the processor to operate, and thus will not be described in detail here.

Although multiple devices of the product defect detection device 2000 are shown in FIG. 1, the present disclosure may only involve some of them. For example, the product defect detection device 2000 only involves the memory 2200, the processor 2100, and the display device 2500.

In the present embodiment, the image acquisition device 1000 is configured to acquire a product image and provide it to the product defect detection device 2000, and the product defect detection device 2000 implements the product defect detection method according to any embodiment of the present disclosure based on the image.

It will be appreciated that, although FIG. 1 only shows one image acquisition device 1000 and one product defect detection device 2000, it does not mean to limit their respective numbers. The product defect detection system 100 may comprise a plurality of image acquisition devices 1000 and/or product defect detection devices 2000.

Second Embodiment

In the manufacturing process of precision products, the products obtained often have various forms of defects due to unstable processes, insufficient mechanical positioning accuracy, and environmental factors in the plant, etc. For wire mesh products that often appear in industrial manufacturing, breakage defects are the main defects. If the wire mesh breakage occurs, it will seriously affect the performance of the product. Therefore, zero missed detection should, as far as possible, be achieved for breakage defects. However, in the early stage of product manufacturing, flawed samples are usually few, it is impossible to accurately detect flawed products using the current popular classification algorithms based on deep learning.

With respect to the above problem of breakage defect detection of wire mesh products, the general concept of the embodiments of the present disclosure is as follows: first, obtaining image blocks probably including a product defect based on the image of the wire mesh product, and performing rough classification on these image blocks based on the shape features of the image blocks to obtain the image blocks probably including a defect; then extracting the texture features of these image blocks probably including a defect; and finally, performing fine classification using the classifier based on the texture features to identify the defect included in the wire mesh product. In the present embodiment, the wire mesh product is taken as an example to illustrate specific technical details, but the technical solutions of the present embodiment is not limited to the scenarios of detecting of wire mesh products.

Figure 2:
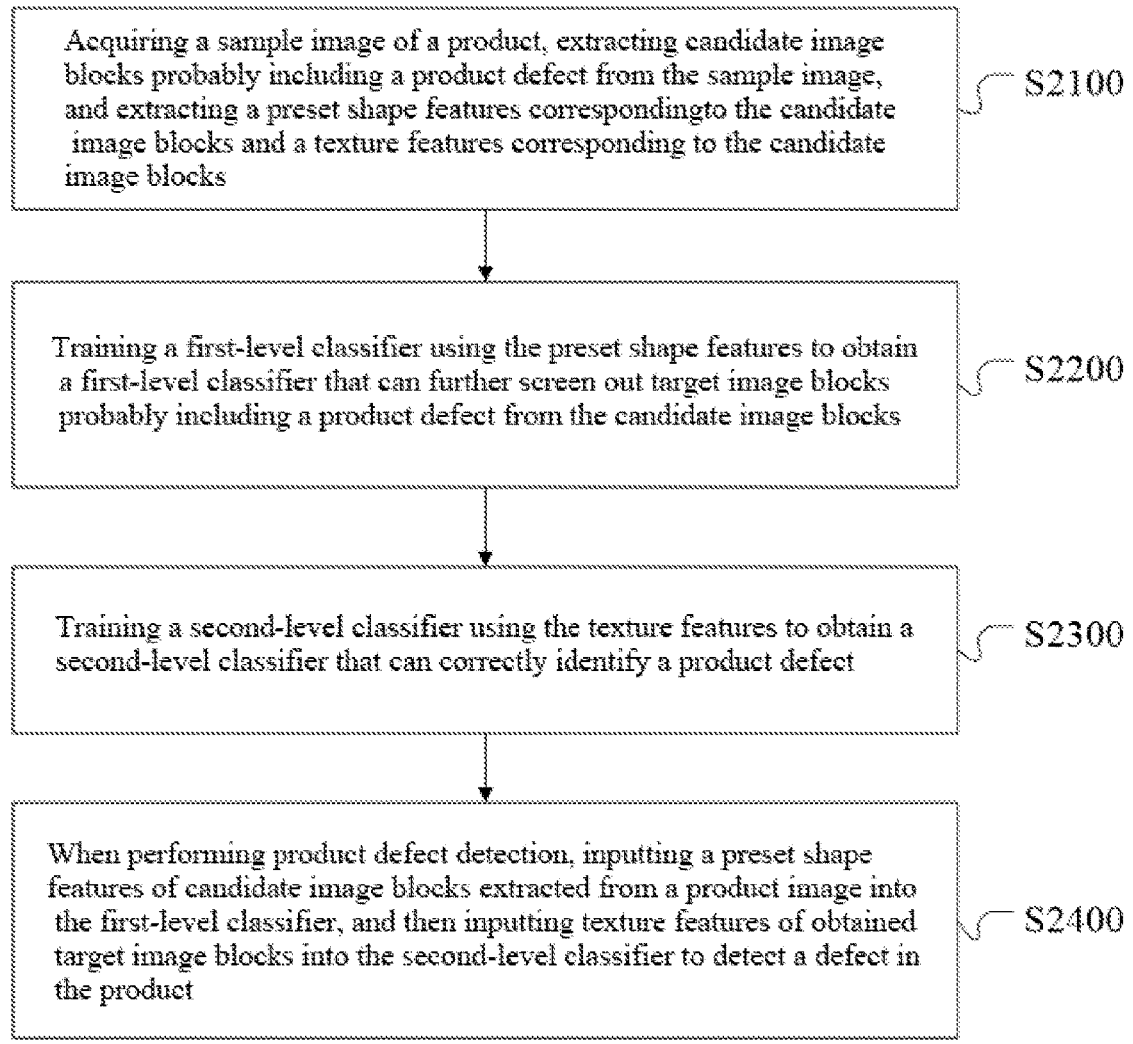
FIG. 2 is a flowchart of a product defect detection method according to an embodiment of the present disclosure.

FIG. 2 is a flowchart of a product defect detection method according to an embodiment of the present disclosure. As shown in FIG. 2, the method in the present embodiment comprises:

S2100: acquiring a sample image of a product, extracting candidate image blocks probably including a product defect from the sample image, and extracting preset shape features corresponding to the candidate image blocks and texture features corresponding to the candidate image blocks.

This step completes the first screening of image blocks by extracting candidate image blocks probably including a product defect from the sample image. In the present embodiment, a plurality of initial image blocks can be obtained by performing region detection on the sample image of the product. For example, in a sample image with a size of 512*512 pixels, if a grid of the wire mesh product corresponds to a size of 100*100 pixels, about 36 initial image blocks can be obtained by performing region detection. Since the initial image blocks may include many image blocks without a defect, and there is a large difference in area between a normal image block and an image block including a product defect, this step can extract candidate image blocks from the initial image blocks based on the area features of the image blocks, and the extracted candidate image blocks include image blocks probably including a defect.

S2200: training a first-level classifier using the preset shape features to obtain a first-level classifier that can further screen out target image blocks probably including a product defect from the candidate image blocks.

Since the candidate image blocks are screened out from the initial image blocks based on the area features, there are many image blocks without a product defect in the candidate image blocks. Thus, the present embodiment trains the first-level classifier based on the preset shape features of the candidate image blocks, so as to during the product defect detection, screen out the target image blocks with a higher probability of including a product defect by performing a rough classification operation, thereby reducing the number of image blocks that need to be processed in subsequent fine classification operation and reducing the time taken by the whole defect detection. The rough classification operation includes the first screening of image blocks which extracts candidate image blocks probably including a product defect from the sample image and the second screening of image blocks which uses the first-level classifier to classify the candidate image blocks; the fine classification operation includes the third screening of image blocks which uses the second-level classifier to classify the target image blocks.

S2300: training a second-level classifier using the texture features to obtain a second-level classifier that can correctly identify a product defect.

In the present embodiment, the first-level classifier is trained based on the shape features of the candidate image blocks, and the target image blocks separated by the first-level classifier may include image blocks without a product defect. Therefore, in this step the second-level classifier is trained using the texture feature of the candidate image block. When the second-level classifier trained in this way is used to classify the target image blocks, it can accurately classify the mage blocks including a product defect and the image blocks without a product defect in the target image blocks, thereby screening out target image blocks including a product defect and completing the product defect detection.

S2400: when performing product defect detection, inputting preset shape features of candidate image blocks extracted from a product image into the first-level classifier, and then inputting texture features of obtained target image blocks into the second-level classifier to detect a defect in the product.

The present embodiment trains a first-level classifier and a second-level classifier using sample images in advance, and when detecting product defects, performs the first screening of candidate image blocks by extracting candidate image blocks probably including a product defect from the product image, and performs the second screening of candidate image blocks of the product image using the first-level classifier. The rough classification operation of the image blocks is completed by the first screening and the second screening. Then the third screening is performed by screening the target image blocks using the second-level classifier. The fine classification operation of the image blocks is completed by the third screening. Through the combination of the rough classification operation and the fine classification operation, the target image blocks including a product defect can be screened out, namely, the defects in the product can be quickly and accurately detect based on the target image blocks including a product defect.

Third Embodiment

The present embodiment of the present disclosure further provides a product defect detection method. In the present embodiment, the sample image includes a plurality of positive sample images, one negative sample image, and one annotated image; the positive sample images are unqualified-product images including a product defect, the negative sample image is a qualified-product image without a product defect, and the annotated image is a binary image in which the pixel value of a position including a product defect is the first value (for example, 255), and the pixel value of a position without a product defect is the second value (for example, 0).

In the step S2100, extracting candidate image blocks probably including a product defect from the sample image comprises S2110~S2130:

S2110: acquiring initial image blocks included in each positive sample image and the negative sample image.

In an embodiment, the initial image blocks can be extracted by the following method:

performing image binarization processing on each positive sample image and the negative sample image, and obtaining a binarized image corresponding to the positive sample image and a binarized image corresponding to the negative sample image; and performing region detection on the binarized images, for example, using region detection functions regionprops in the image detection tool skimage.measure to perform region detection on the binarized images and obtaining initial image blocks included in each positive sample image and the negative sample image.

S2120: screening out initial image blocks whose image block areas are greater than a first preset area value from the negative sample image, and using the initial image blocks screened out as the candidate image blocks extracted from the negative sample image.

The first preset area value can be set according to product defect features. For example, if the area of a grid including a breakage defect in a certain wire mesh product is generally greater than 100 pixel points, the initial image block with an area greater than 100 pixel points detected from the negative sample image can be used as the candidate image block of the negative sample image, and herein PN denotes the candidate image blocks of the negative sample image.

S2130: screening out initial image blocks which intersect positionally with an image block on the annotated image and have an intersection area greater than a second preset value from the positive sample image, and using the initial image blocks screened out as the candidate image blocks extracted from the positive sample image.

The second preset value can be set according to actual needs. The greater the second preset value is, the greater the probability that the candidate image blocks screened out from the initial image blocks of the positive sample image have a product defect is, and the smaller the number of candidate image blocks screened out is. Conversely, the smaller the second preset value is, the smaller the probability that the candidate image blocks screened out from the initial image blocks of the positive sample image have a product defect is, and the greater the number of candidate image blocks screened out is.

For example, with respect to the initial image blocks of the positive sample image, any initial image block, which intersects with an image block including a defect on the annotated image and has an intersection area greater than 50% of the area of this initial image block, is used as the candidate image block of the positive sample image, and herein PP denotes the candidate image blocks of the positive sample image.

The first screening of image blocks is completed by the above steps S2110~S2130. After the candidate image blocks are screened out, the following scheme 1 can be used to extract the preset shape features corresponding to the candidate image blocks, and use the extracted preset shape features to train the first-level classifier; and the following scheme 2 can be used to extract the texture features corresponding to the candidate image blocks, and uses the extracted texture features to train the second-level classifier.

Scheme 1: First-Level Classifier

The preset shape features corresponding to the candidate image blocks are extracted by the following steps S11~S12, and the first-level classifier is trained using the extracted preset shape features.

S11: extracting one or more of the following four features of the candidate image block as the preset shape feature: a region area, an area of a minimum circumscribed rectangle, an eccentricity and an area ratio.

Among them, the eccentricity is the ratio of the focal length to the major axis length of an ellipse which is equivalent to and has a same second order moment as the candidate image block. Namely, the candidate image block is equivalent to an ellipse having the same second order moment, and the ratio of the focal length to the length of the major axis of the ellipse is calculated, and the ratio is the eccentricity of the candidate image block. Since the shape of each candidate image block may be different, the second order moment of the ellipse equivalent to each candidate image block may also be different, and the corresponding eccentricity of each candidate image block may also be different. Assuming that there are 50 candidate image blocks, each candidate image block can be equivalent to an ellipse, and the 50 ellipses may have different second order moments.

The area ratio is the ratio of the number of pixels in the candidate image block and the number of pixels in a minimum circumscribed rectangle of the candidate image block.

The candidate image blocks in Scheme 1 refer to the image blocks represented by PN and PP. Taking the candidate image blocks screened out from the positive sample image represented by PP as an example, in a preferred solution, the following four features are used as the preset shape feature of the candidate image block PP: a region area of PP, an area of a minimum circumscribed rectangle of PP, an eccentricity of PP and an area ratio of PP.

S12: setting initial parameters of the first-level classifier; performing adversarial training on the first-level classifier using the preset shape features of the candidate image blocks extracted from the negative sample image and the preset shape features of the candidate image blocks extracted from the positive sample images; and optimizing classifier parameters of the first-level classifier based on a adversarial training result until the adversarial training result meets a preset value. For example, the adversarial training is stopped when the classification accuracy rate of the first-level classifier reaches 95%, and the classifier parameters at this point are used as the final parameters of the first-level classifier.

The first-level classifier includes but is not limited to SVM (Support Vector Machine) classifier, K nearest neighbor classifier, decision tree classifier (including XGBClassifier), etc. Since XGBClassifier has the characteristics of fast running speed and high accuracy, it may be used in the present embodiment as the first-level classifier. During training, the gbtree model can be used as the base classifier. Correspondingly, it is necessary to set the initial value of the tree depth of the gbtree model, the initial value of the iterative update step, the initial value of the number of decision trees, and the initial value of the penalty coefficient, etc.

Scheme 2: Second Class Classifier

The texture features corresponding to the candidate image blocks are extracted by the following steps S21~S22, and the second-level classifier is trained using the extracted texture features.

S21: detecting an image region of the sample image where a minimum circumscribed rectangle of the candidate image block (i.e., the image blocks represented by PN and PP) is located; and extracting an LBP (Local Binary Patterns) feature of the image region, and using the LBP feature as the texture feature.

When detecting the minimum circumscribed rectangle of each candidate image block, since the shape of each candidate image block is different, the size of the minimum circumscribed rectangle of each candidate image block is also different. In a preferred solution of this step, the size of the minimum circumscribed rectangle of each candidate image block is adjusted, the circumscribed rectangle of each candidate image block after adjustment is obtained, and the circumscribed rectangle of each candidate image block after adjustment has the same size. After obtaining the circumscribed rectangle having the same size, the image region of the sample image where the circumscribed rectangle of each candidate image block is located is detected, and the LBP feature of the image region is extracted as the texture feature of the candidate image block.

For example, the candidate image blocks patch1, patch2, and patch3 are obtained, and the minimum circumscribed rectangles of the three candidate image blocks patch1, patch2, and patch3 are box1', box2', and box3', respectively. The sizes of the minimum circumscribed rectangles box1', box2', and box3' are adjusted to the sizes of box1, box2, and box3, respectively, and the adjusted circumscribed rectangles box1, box2, and box3 have the same size. In this way, when extracting the LBP feature, the image region I1 of the sample image where the circumscribed rectangle box1 of the candidate image block patch1 is located is detected, and the LBP feature of the area image I1 is extracted as the texture feature of the candidate image block patch1. Similarly to the texture feature extraction method of the candidate image block patch1, the image region I2 (or I3) of the sample image where the circumscribed rectangle box2 (or box3) of the candidate image block patch2 (or patch3) is located is detected, and the LBP feature of the image region I2 (or I3) is extracted as the texture feature of the candidate image block patch2 (or patch3).

S22: setting initial parameters of the second-level classifier; performing adversarial training on the second-level classifier using the texture features of the candidate image blocks extracted from the negative sample image and the texture features of the candidate image blocks extracted from the positive sample images; and optimizing classifier parameters of the second-level classifier based on a adversarial training result until the adversarial training result meets a preset value. For example, the adversarial training is stopped when the classification accuracy rate reaches 95%. The second-level classifier can be implemented by an SVM classifier.

Figure 3:
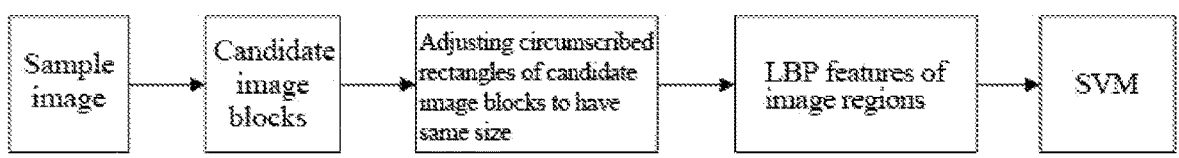
FIG. 3 is a schematic diagram of a training process of a second-level classifier according to an embodiment of the present disclosure.

As shown in FIG. 3, the process of training the second-level classifier comprises:

First, the candidate image blocks of the sample image are extracted by steps S2110~S2130, namely, the image blocks represented by PN and PP are obtained. Then the minimum circumscribed rectangle of each candidate image block is detected, and the size of the minimum circumscribed rectangles is adjusted so that the size of the circumscribed rectangle of each candidate image block is the same. Then the LBP feature of the image region of the sample image where the circumscribed rectangle of each candidate image block is located is calculated. Finally, the LBP features extracted from the candidate image blocks of the positive sample image and the LBP features extracted from the candidate image blocks of the negative sample image are input into the SVM classifier for adversarial training, and the classification result of the adversarial training is obtained.

The SVM classifier can use a linear kernel function, set the error item penalty coefficient to be 1000 and enable probability estimation.

Fourth Embodiment

The present embodiment further provides a product defect detection method. In the present embodiment, the above step S2400 (i.e., when performing product defect detection, inputting preset shape features of candidate image blocks extracted from a product image into the first-level classifier, and then inputting texture features of obtained target image blocks into the second-level classifier to detect a defect in the product) further comprises S2410~S2450:

S2410: providing one or more first-level classifiers, inputting the preset shape features of candidate image blocks extracted from the product image into the one or more first-level classifiers, and detecting and obtaining target image blocks.

When providing one first-level classifier, the preset shape feature of each candidate image block can be sequentially input into the first-level classifier for classification processing. Namely, first, the preset shape feature of the first candidate image block is input into the first-level classifier; after the first-level classifier completes classifying this candidate image block, the preset shape feature of the second candidate image block is input into the first-level classifier; in this way, the classification processing of all candidate image blocks is completed using the first-level classifier.

When providing multiple first-level classifiers, the preset shape features of multiple candidate image blocks can be input into the corresponding first-level classifiers, and classification processing is performed on multiple candidate image blocks in parallel using multiple first-level classifiers. For example, if ten candidate image blocks are extracted from a product image, ten first-level classifiers can be provided; the preset shape features of these ten candidate image blocks are input into the corresponding ten first-level classifiers, and the ten first-level classifiers perform classification processing in parallel on the ten candidate image blocks.

S2420: providing a plurality of second-level classifiers, inputting texture features of the obtained target image blocks into corresponding second-level classifiers, and determining whether there is a defect in the product according to a plurality of classification results output by the second classifiers.

In the present embodiment, the number of second-level classifiers can be set according to the number of target image blocks. For example, when there are ten target image blocks, ten second-level classifiers can be provided. In order to perform processing in parallel on the target image blocks using multiple second-level classifiers, a preferred solution is, before inputting the obtained target image block into the second-level classifier, to adjust the size of the minimum circumscribed rectangle of each target image block to obtain an adjusted circumscribed rectangle of each target image block, and the adjusted circumscribed rectangle of each target image block has the same size.

It should be noted that, in the present disclosure, when the second-level classifier is trained, the texture feature of the candidate image block is used as the training data, so in the training stage the size of the minimum circumscribed rectangle of the candidate image block is adjusted. Correspondingly, the texture feature of the target image block is used as the detection data during the product defect detection, so in the detection stage the size of the minimum circumscribed rectangle of the target image block is adjusted.

After obtaining the circumscribed rectangle of the same size, the target region of the product image where the circumscribed rectangle of the target image block is located is detected, the LBP feature of the target region is calculated as the texture feature of the target image block, and the texture feature is input into the second-level classifier for classification processing.

When the classification results of all target image blocks are the first value, for example, when the classification results of all target image blocks are 0, it is determined that the product is a qualified product and has no defect. When the classification result of one or more target image blocks is the second value, for example, when the classification result of one target image block is 1, it is determined that the product has a defect.

In an application scenario of the present embodiment, a defect detection framework can be built based on the first-level classifier and the second-level classifier, and the defect detection framework includes a rough classification network and a fine classification network.

The rough classification network includes at least one first branch, and the first branch at least includes a shape feature extraction structure for extracting the preset shape feature and a first-level classifier.

The fine classification network includes a judgment structure for performing logic judgment on the classification results and multiple second branches, and each second branch includes a size adjustment structure for adjusting the size of a circumscribed rectangle, a texture feature extraction structure for extracting the texture feature and a second-level classifier.

Figure 4:
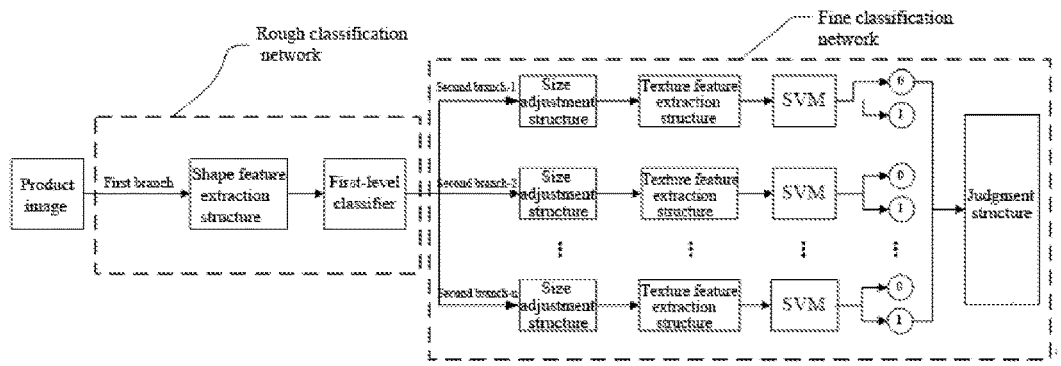
FIG. 4 is a schematic diagram of a defect detection framework according to an embodiment of the present disclosure.

Referring to FIG. 4, in the defect detection framework shown in FIG. 4, the rough classification network includes one first branch and n second branches.

Among them, the first branch receives the candidate image block and performs preset shape feature extraction on the received candidate image block using the shape feature extraction structure, and inputs the extracted preset shape feature to the first-level classifier for classification to detect whether the candidate image block can be classified as the target image block.

The first branch inputs the multiple target image blocks screened out into the corresponding size adjustment structures. Assuming that the first branch screens out n target image blocks, then the first target image block is input into the size adjustment structure of the second branch No. 1 (second branch-1) in FIG. 4, the second target image block is input into the size adjustment structure of the second branch No. 2 (second branch-2) in FIG. 4, and in this way, the nth target image block is input into the size adjustment structure of the second branch No. n (second branch-n) in FIG. 4; the sizes of the minimum circumscribed rectangles of the target image blocks are adjusted in parallel using these n size adjustment structures, so that each target image block has a circumscribed rectangle of the same size. After the size adjustment structure completes the size adjustment, the circumscribed rectangles after adjustment are input into the corresponding texture feature extraction structures, and the multiple texture feature extraction structures detect the target regions in the product image in parallel based on the circumscribed rectangles received. The texture features of the target regions are extracted and input into the corresponding second-level classifiers. The target image blocks are classified using the second-level classifiers. As shown in FIG. 4, the second-level classifiers include multiple SVM classifiers. The classification results of each SVM classifier include 1 and 0, where 1 indicates that the target image block has a product defect and 0 indicates that the target image block does not have a product defect.

After obtaining the classification result of each target image block, the judgment structure of the fine classification network judges whether the product has a defect.

Continuing to refer to FIG. 4, when the classification results of these n target image blocks are all 0, the judgment structure judges that the product is a qualified product and has no defect; when the classification results of at least one target image block in these n target image blocks is 1, the judgment structure judges that the product is unqualified and has a product defect.

It should be noted that, the number of target image blocks shown in FIG. 4 is the same as the number of second branches in the fine classification network, but in some embodiments, the number of second branches in the fine classification network may be different from the number of target image blocks. For example, the number of second branches may be greater than the number of target image blocks.

The defects in the product can be detected quickly and accurately by the above steps S2410~S2420. The product defect detection method of the present embodiment is more effective for the breakage defects of wire mesh products, and can quickly train corresponding first-level classifiers and second-level classifiers when the number of samples is small. Therefore, it can meet the needs of the production line and effectively improve the inspection efficiency of the production line in the early stage of production.

Fifth Embodiment

Figure 5:
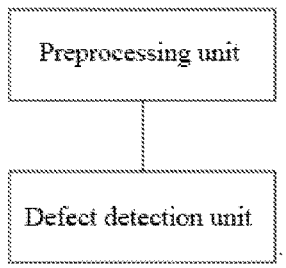
FIG. 5 is a block diagram of the structure of a product defect detection device according to an embodiment of the present disclosure.

FIG. 5 is a block diagram of the structure of a product defect detection device according to an embodiment of the present disclosure. As shown in FIG. 5, the device in the present embodiment comprises:

a preprocessing unit configured to acquire a sample image of a product, extract candidate image blocks probably including a product defect from the sample image, and extract preset shape features corresponding to the candidate image blocks and texture features corresponding to the candidate image blocks; train a first-level classifier using the preset shape features to obtain a first-level classifier that can further screen out target image blocks probably including a product defect from the candidate image blocks; train a second-level classifier using the texture features to obtain a second-level classifier that can correctly identify a product defect; and a defect detection unit configured to, when performing product defect detection, input preset shape features of candidate image blocks extracted from a product image into the first-level classifier, and then input texture features of obtained target image blocks into the second-level classifier to detect a defect in the product.

In some embodiments, the sample image includes a plurality of positive sample images, one negative sample image, and one annotation image. Correspondingly, the preprocessing unit comprises a first processing module configured to acquire initial image blocks included in each positive sample image and the negative sample image; screen out initial image blocks whose image block areas are greater than a first preset area value from the negative sample image, and use the initial image blocks screened out as the candidate image blocks extracted from the negative sample image; and screen out initial image blocks which intersect positionally with an image block on the annotated image and have an intersection area greater than a second preset value from each positive sample image, and use the initial image blocks screened out as the candidate image blocks extracted from the positive sample image.

The first processing module is specifically configured to perform image binarization processing on each positive sample image and the negative sample image, and obtain a binarized image corresponding to the positive sample image and a binarized image corresponding to the negative sample image; and perform region detection on the binarized images, and obtain initial image blocks included in each positive sample image and the negative sample image.

In some embodiments, the preprocessing unit comprises a second processing module configured to extract one or more of the following four features of the candidate image block: a region area, an area of a minimum circumscribed rectangle, an eccentricity and an area ratio; wherein the eccentricity is a ratio of a focal length to a major axis length of an ellipse which is equivalent to and has a same second order moment as the candidate image block, and the area ratio is a ratio of a number of pixels in the candidate image block and a number of pixels in a minimum circumscribed rectangle of the candidate image block.

In some embodiments, the preprocessing unit comprises a third processing module configured to detect an image region of the sample image where a minimum circumscribed rectangular of the candidate image block is located; and extract an LBP feature of the image region, and use the LBP feature as the texture feature.

In some embodiments, the defect detection unit comprises: one or more first-level classifiers, a texture feature extraction module, multiple second-level classifiers, and a judgment module.

The one or more first-level classifiers are configured to classify the candidate image blocks according to the received preset shape features of the candidate image blocks extracted from the product image, and obtain the target image blocks separated from the candidate image blocks.

The texture feature extraction module is configured to detect the target region of the product image where the minimum circumscribed rectangle of the target image block is located, extract the LBP feature of the target region, and input the LBP feature as the texture feature of the target image block into the second-level classifier.

The multiple second-level classifiers are configured to classify each target image block according to the received texture feature of the target image block to obtain a classification result of each target image block.

The judgment module is configured to judge whether there is a defect in the product according to the classification result of each target image block. Specifically, it is configured to determine that the product is qualified and has no defect when the classification results of all target image blocks are the first value, and determine that the product has a defect when the classification results of one or more target image blocks are the second value.

In some embodiments, the defect detection unit further comprises a size adjustment module configured to adjust the size of the minimum circumscribed rectangle of each target image block to obtain an adjusted circumscribed rectangle of each target image block, and the adjusted circumscribed rectangle of each target image block has the same size.

Correspondingly, the texture feature extraction module is configured to detect the target region of the product image where the circumscribed rectangle of the target image block is located, extract the LBP feature of the target region, and input the LBP feature as the texture feature of the target image block into the second-level classifier.

For the specific implementing mode of each unit and module in the device embodiment, please refer to the related content of the method embodiment, which will not be repeated here.

Sixth Embodiment

Figure 6:
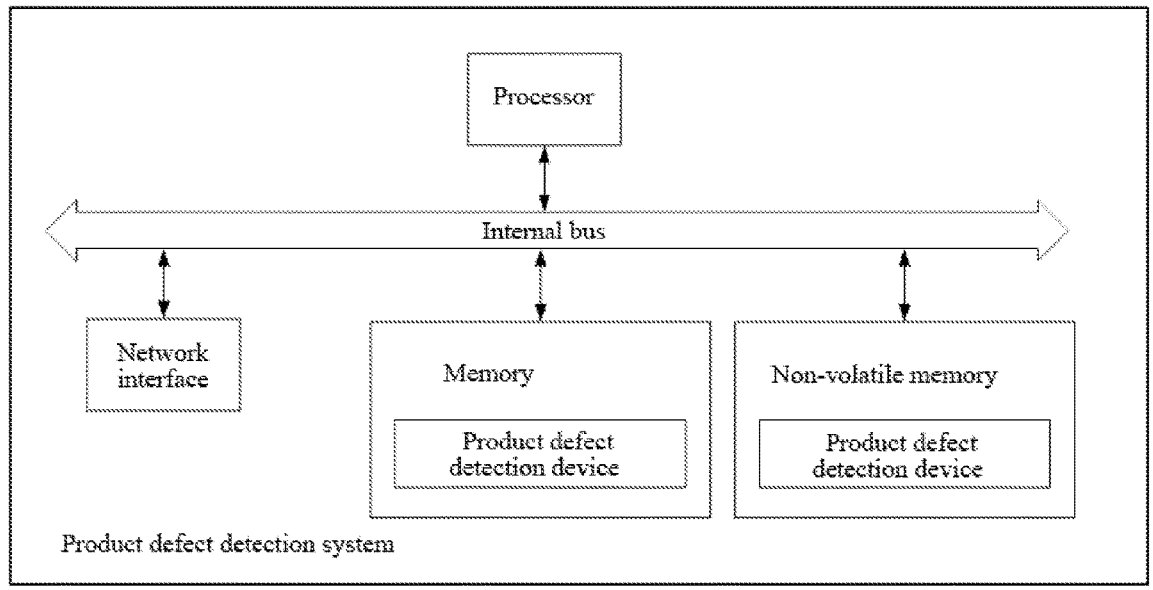
FIG. 6 is a block diagram of the structure of a product defect detection system according to an embodiment of the present disclosure.

FIG. 6 is a block diagram of the structure of a product defect detection system according to an embodiment of the present disclosure. As shown in FIG. 6, at the hardware level, the product defect detection system includes a processor, and optionally an internal bus, a network interface, and a memory. Among them, the memory may include an internal memory, such as high-speed random access memory (Random-Access Memory, RAM), and may also include non-volatile memory (non-volatile memory), such as at least one disk memory.

The processor, network interface and memory can be connected to each other via an internal bus. The internal bus can be an ISA (Industry Standard Architecture) bus, a PCI (Peripheral Component Interconnect) bus or an EISA (Extended Industry Standard Architecture) bus, etc. The bus can be divided into address bus, data bus, control bus, etc. For ease of presentation, only one bidirectional arrow is shown in FIG. 6, but it does not mean that there is only one bus or one type of bus.

Memory is used to store programs. Specifically, the program may include program codes, and the program codes include computer executable instructions. The memory may include internal memory and non-volatile memory, and provide instructions and data to the processor.

The processor reads the corresponding computer program from the non-volatile memory into the internal memory and then runs it to form a product defect detection device on a logical level. The processor executes the program stored in the memory to implement the product defect detection method as described above.

The method performed by the product defect detection device disclosed in the embodiment shown in FIG. 6 of this specification can be applied to a processor or implemented by the processor. The processor may be an integrated circuit chip having signal processing capabilities. In the implementation process, the steps of the product defect detection method described above can be completed by integrated logic circuits (in the form of hardware) or instructions (in the form of software) in the processor. The processor may be a general-purpose processor including a central processing unit (CPU), a network processor (NP), etc.; it may also be a digital signal processor (DSP), an application specific integrated circuit (ASIC), a field-programmable gate array (FPGA) or other programmable logic devices, discrete gates or transistor logic devices, discrete hardware components, which can implement or execute the methods, steps, and logical block diagrams disclosed in the embodiments of this specification. The general-purpose processor may be a microprocessor or any conventional processor or the like. The steps of the method disclosed in the embodiments of this specification can be directly embodied as hardware and executed by a decoding processor, or executed by a combination of hardware in the decoding processor and software modules. The software module can be located in a storage medium well known in the art such as random access memory, flash memory, read-only memory, programmable read-only memory, or electrically erasable programmable memory, registers, etc. The storage medium is located in the memory, and the processor reads the information in the memory and cooperates with its hardware to complete the steps of the above product defect detection method in combination with.

The present disclosure also provides a computer-readable storage medium.

The computer-readable storage medium stores one or more computer programs. The one or more computer programs include instructions. When the instructions are executed by the processor, the product defect detection method as described above can be implemented.

In order to clearly describe the technical solutions of the embodiments of the present disclosure, in the embodiments of the present disclosure, words such as "first" and "second" are used to distinguish the same or similar items having basically the same function and effect. A person skilled in the art can understand that the words "first" and "second" are not intended to limit the quantity and execution order.

The above merely describe particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A product defect detection method, comprising:
acquiring a sample image of a product, extracting candidate image blocks probably including a product defect from the sample image, and extracting preset shape features corresponding to the candidate image blocks and texture features corresponding to the candidate image blocks;
training a first-level classifier using the preset shape features to obtain a first-level classifier that can further screen out target image blocks probably including a product defect from the candidate image blocks;
training a second-level classifier using the texture features to obtain a second-level classifier that can correctly identify a product defect; and
when performing product defect detection, inputting preset shape features of candidate image blocks extracted from a product image into the first-level classifier, and then inputting texture features of obtained target image blocks into the second-level classifier to detect a defect in the product.

2. The method according to claim 1, wherein the sample image includes a plurality of positive sample images, one negative sample image, and one annotated image, and
extracting candidate image blocks probably including a product defect from the sample image comprise:
acquiring initial image blocks included in each positive sample image and the negative sample image;
screening out initial image blocks whose image block areas are greater than a first preset area value from the negative sample image, and using the initial image blocks screened out as the candidate image blocks extracted from the negative sample image; and
screening out initial image blocks which intersect positionally with an image block on the annotated image and have an intersection area greater than a second preset value from each positive sample image, and using the initial image blocks screened out as the candidate image blocks extracted from the positive sample image.

3. The method according to claim 2, wherein with respect to an initial image block of the positive sample image, the second preset value is set to 50% of an area of the initial image block.

4. The method according to claim 2, wherein training a first-level classifier using the preset shape features to obtain a first-level classifier that can further screen out target image blocks probably including a product defect from the candidate image blocks comprises:
setting initial parameters of the first-level classifier;
performing adversarial training on the first-level classifier using the preset shape features of the candidate image blocks extracted from the negative sample image and the preset shape features of the candidate image blocks extracted from the positive sample images; and
optimizing classifier parameters of the first-level classifier based on a adversarial training result until the adversarial training result meets a preset value.

5. The method according to claim 2, wherein acquiring initial image blocks included in each positive sample image and the negative sample image comprises:
performing image binarization processing on each positive sample image and the negative sample image, and obtaining a binarized image corresponding to the positive sample image and a binarized image corresponding to the negative sample image;
performing region detection on the binarized images, and obtaining initial image blocks included in each positive sample image and the negative sample image.

6. The method according to claim 1, wherein extracting preset shape features corresponding to the candidate image blocks comprises:
extracting one or more of the following four features of the candidate image block: a region area, an area of a minimum circumscribed rectangle, an eccentricity and an area ratio;
wherein the eccentricity is a ratio of a focal length to a major axis length of an ellipse which is equivalent to and has a same second order moment as the candidate image block, and the area ratio is a ratio of a number of pixels in the candidate image block and a number of pixels in a minimum circumscribed rectangle of the candidate image block.

7. The method according to claim 1, wherein extracting a texture feature corresponding to the candidate image block comprises:
detecting an image region of the sample image where a minimum circumscribed rectangle of the candidate image block is located; and
extracting a Local Binary Patterns LBP feature of the image region, and using the LBP feature as the texture feature.

8. The method according to claim 1, wherein when performing product defect detection, inputting preset shape features of candidate image blocks extracted from a product image into the first-level classifier, and then inputting texture features of obtained target image blocks into the second-level classifier to detect a defect in the product comprises:
providing one or more first-level classifiers, inputting preset shape features of candidate image blocks extracted from the product image into the one or more first-level classifiers, and detecting and obtaining target image blocks;
providing a plurality of second-level classifiers, inputting texture features of the obtained target image blocks into corresponding second-level classifiers, and determining whether there is a defect in the product according to a plurality of classification results output by the second classifiers.

9. The method according to claim 8, wherein determining whether there is a defect in the product according to a plurality of classification results output by the second classifiers comprises:

when classification results of all target image blocks are a first value, determining that the product is a qualified product and has no defect; when classification results of one or more target image blocks are a second value, determining that the product has a defect.

10. The method according to claim 1, wherein before inputting obtained target image blocks into the second-level classifier, the method further comprises:
adjusting a size of a minimum circumscribed rectangle of each target image block to obtain a circumscribed rectangle of each target image block after adjusted, wherein the circumscribed rectangle of each target image block after adjusted has a same size.

11. A product defect detection system, comprising: a memory and a processor;
the memory stores computer executable instructions;
when the computer executable instructions are executed, the processor executes a product defect detection method according to claim 1.

12. The system according to claim 11, wherein the sample image includes a plurality of positive sample images, one negative sample image, and one annotated image, and
extracting candidate image blocks probably including a product defect from the sample image comprise:
acquiring initial image blocks included in each positive sample image and the negative sample image;
screening out initial image blocks whose image block areas are greater than a first preset area value from the negative sample image, and using the initial image blocks screened out as the candidate image blocks extracted from the negative sample image; and
screening out initial image blocks which intersect positionally with an image block on the annotated image and have an intersection area greater than a second preset value from each positive sample image, and using the initial image blocks screened out as the candidate image blocks extracted from the positive sample image.

13. The system according to claim 12, wherein with respect to an initial image block of the positive sample image, the second preset value is set to 50% of an area of the initial image block.

14. The system according to claim 12, wherein training a first-level classifier using the preset shape features to obtain a first-level classifier that can further screen out target image blocks probably including a product defect from the candidate image blocks comprises:
setting initial parameters of the first-level classifier;
performing adversarial training on the first-level classifier using the preset shape features of the candidate image blocks extracted from the negative sample image and the preset shape features of the candidate image blocks extracted from the positive sample images; and
optimizing classifier parameters of the first-level classifier based on a adversarial training result until the adversarial training result meets a preset value.

15. The system according to claim 11, wherein extracting preset shape features corresponding to the candidate image blocks comprises:
extracting one or more of the following four features of the candidate image block: a region area, an area of a minimum circumscribed rectangle, an eccentricity and an area ratio;
wherein the eccentricity is a ratio of a focal length to a major axis length of an ellipse which is equivalent to and has a same second order moment as the candidate image block, and the area ratio is a ratio of a number of pixels in the candidate image block and a number of pixels in a minimum circumscribed rectangle of the candidate image block.

16. The system according to claim 11, wherein extracting a texture feature corresponding to the candidate image block comprises:
detecting an image region of the sample image where a minimum circumscribed rectangle of the candidate image block is located; and
extracting a Local Binary Patterns LBP feature of the image region, and using the LBP feature as the texture feature.

17. A product defect detection device, comprising:
a preprocessing unit configured to, acquire a sample image of a product, extract candidate image blocks probably including a product defect from the sample image, and extract preset shape features corresponding to the candidate image blocks and texture features corresponding to the candidate image blocks; train a first-level classifier using the preset shape features to obtain a first-level classifier that can further screen out target image blocks probably including a product defect from the candidate image blocks; train a second-level classifier using the texture features to obtain a second-level classifier that can correctly identify a product defect; and
a defect detection unit configured to, when performing product defect detection, input preset shape features of candidate image blocks extracted from a product image into the first-level classifier, and then input texture features of obtained target image blocks into the second-level classifier to detect a defect in the product.

18. The device according to claim 17, wherein
the sample image includes a plurality of positive sample images, one negative sample image, and one annotated image, and
the preprocessing unit comprises a first processing module configured to
acquire initial image blocks included in each positive sample image and the negative sample image;
screen out initial image blocks whose image block areas are greater than a first preset area value from the negative sample image, and use the initial image blocks screened out as the candidate image blocks extracted from the negative sample image; and
screen out initial image blocks which intersect positionally with an image block on the annotated image and have an intersection area greater than a second preset value from each positive sample image, and use the initial image blocks screened out as the candidate image blocks extracted from the positive sample image.

19. The device according to claim 17, wherein
the preprocessing unit further comprises a second processing module configured to extract one or more of the following four features of the candidate image block: a region area, an area of a minimum circumscribed rectangle, an eccentricity and an area ratio;
wherein the eccentricity is a ratio of a focal length to a major axis length of an ellipse which is equivalent to and have a same second order moment as the candidate image block, and the area ratio is a ratio of a number of pixels in the candidate image block and a number of pixels in a minimum circumscribed rectangle of the candidate image block.

20. The device according to claim 17, wherein
the preprocessing unit further comprises a third processing module configured to detect an image region of the sample image where a minimum circumscribed rectangle of the candidate image block is located; and extract an LBP (Local Binary Patterns) feature of the image region, and use the LBP feature as the texture feature.

* * * * *